US008411762B2

(12) United States Patent
Chen

(10) Patent No.: US 8,411,762 B2
(45) Date of Patent: Apr. 2, 2013

(54) METHOD AND APPARATUS FOR DATA SYNCHRONIZATION

(75) Inventor: Inching Chen, Portland, OR (US)

(73) Assignee: Intel Corporation, Santa Clara, CA (US)

(*) Notice: Subject to any disclaimer, the term of this patent is extended or adjusted under 35 U.S.C. 154(b) by 1382 days.

(21) Appl. No.: 11/821,866

(22) Filed: Jun. 26, 2007

(65) Prior Publication Data

US 2009/0003462 A1    Jan. 1, 2009

(51) Int. Cl.
*H04N 7/12* (2006.01)
(52) U.S. Cl. .................................................. 375/240.28
(58) Field of Classification Search ............ 375/240.28; 370/503, 509, 496; 380/206, 210, 221, 224, 380/225; 709/230, 248
See application file for complete search history.

(56) References Cited

U.S. PATENT DOCUMENTS

| 7,406,104 | B2* | 7/2008 | Yang et al. | 370/509 |
|---|---|---|---|---|
| 7,487,423 | B2* | 2/2009 | Lobo et al. | 714/744 |
| 7,895,498 | B2* | 2/2011 | Miyata et al. | 714/755 |
| 2004/0136455 | A1* | 7/2004 | Akhter et al. | 375/240 |
| 2004/0202174 | A1* | 10/2004 | Kim et al. | 370/395.1 |
| 2007/0064814 | A1* | 3/2007 | Park et al. | 375/240.28 |

OTHER PUBLICATIONS

ETSI, "Digital Video Broadcasting (DVB); DVB-H Implementation Guidelines," 2005, 10 pages total.
European Standard (Telecommunications Series), "ETSI EN 300 744 V1.4.1 (Jan. 2001)," 2001, 49 pages.
European Standard (Telecommunications Series), "Draft ETSI EN 300 744 V1.3.1 (Aug. 2000)," 2000, 50 pages.

* cited by examiner

*Primary Examiner* — Beemnet Dada
(74) *Attorney, Agent, or Firm* — Trop, Pruner & Hu, P.C.

(57) ABSTRACT

In one embodiment of the invention, a memory receives unsynchronized data and a processor performs symbol interleaving at a synchronization point located after a beginning of a superframe.

20 Claims, 2 Drawing Sheets

METHOD AND APPARATUS FOR DATA SYNCHRONIZATION

BACKGROUND

A receiver, such as a Digital Video Broadcasting-Terrestrial (DVB-T) or Digital Video Broadcasting-Handheld (DVB-H) receiver, must synchronize any broadcast bitstream it receives. While the timing and frequency synchronization time for the receiver's demodulator may take, in some instances, twelve orthogonal frequency-division multiplexing (OFDM) symbols or less, the frame synchronization required before decoding may take as much as one superframe for a DVB-T or DVB-H receiver. Each superframe may consist of 4 frames, each frame having 68 OFDM symbols. This delay may lead to long latency and poor product performance. Thus, a shortened synchronization time is often advantageous. A shortened synchronization time may be particularly advantageous for receivers, such as a DVB-H receiver, which implement time slicing. Time slicing allows a receiver to save battery power by processing part of the received signal that contains wanted data. In other words, such receivers turn off when not in use. However, when the receiver is powered back on, the receiver must again synchronize to the transmitting signal, using power during the synchronization process.

Data synchronization may require multiple synchronization steps. For example, synchronization may be necessary before (1) symbol interleaving, (2) decoding a data packet (e.g., Reed Solomon (RS) packet), and (3) descrambling data. Traditional centralized frame synchronization may start channel decoding in the beginning of a superframe. However, a long delay may occur while waiting for the beginning of a superframe. Traditionally, the beginning of a superframe is a synchronization point for both symbol (e.g., OFDM symbol) interleaving and RS decoding. If the beginning of the superframe is missed, latency may occur because the next synchronization point would not occur for up to 273 OFDM symbols (i.e., 4 frames) or after 243.712 ms for an 8K FFT (Fast Fourier Transform) mode. Again, this potential latency may lead to poor product performance.

BRIEF DESCRIPTION OF THE DRAWINGS

The accompanying drawings, incorporated in and constituting a part of this specification, illustrate one or more implementations consistent with the principles of the invention and, together with the description of the invention, explain such implementations. The drawings are not necessarily to scale, the emphasis instead being placed upon illustrating the principles of the invention. In the drawings.

DETAILED DESCRIPTION

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, and techniques, such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions of well known devices, circuits, and methods have been omitted to avoid clouding the description of the present invention with unnecessary detail.

As stated above, a receiver (e.g., DVB-T receiver or DVB-H receiver) may require the following functions be performed on data: symbol interleaving, decoding a data packet (e.g., Reed Solomon (RS) packet), and descrambling data. Possible operational requirements for each of these functions, which may occur in the channel decoder, are set out as an initial matter. First, symbol interleaving may synchronize at any symbol (e.g., OFDM symbol). The size of an OFDM symbol may range from, for example, 189 bytes per symbol for 2K FFT, quadrature phase-shift keying (QPSK) with ½ (code rate), all the way to 3969 bytes per symbol for 8K FFT, 64 quadrature amplitude modulation (QAM), ⅞ (code rate). Second, RS decoding may decode for every RS packet. Each RS packet may have 204 bytes, consisting of 188 bytes of data and 16 bytes of check code. Third, data descrambling may repeat for every 8 transport stream packets (TSP). The scrambling may be done by applying a pseudo-random bit sequence (PRBS) to TSP data. Each TSP may be 188 bytes long. Each TSP may start with a synchronization byte, 0x47, except for the first TSP. The first TSP may start with 0xB8 (i.e., bit-wise inverted from 0x47) which may serve as an initialization for the descrambler. The period of the PRBS may be 1503 bytes.

Figure 1:
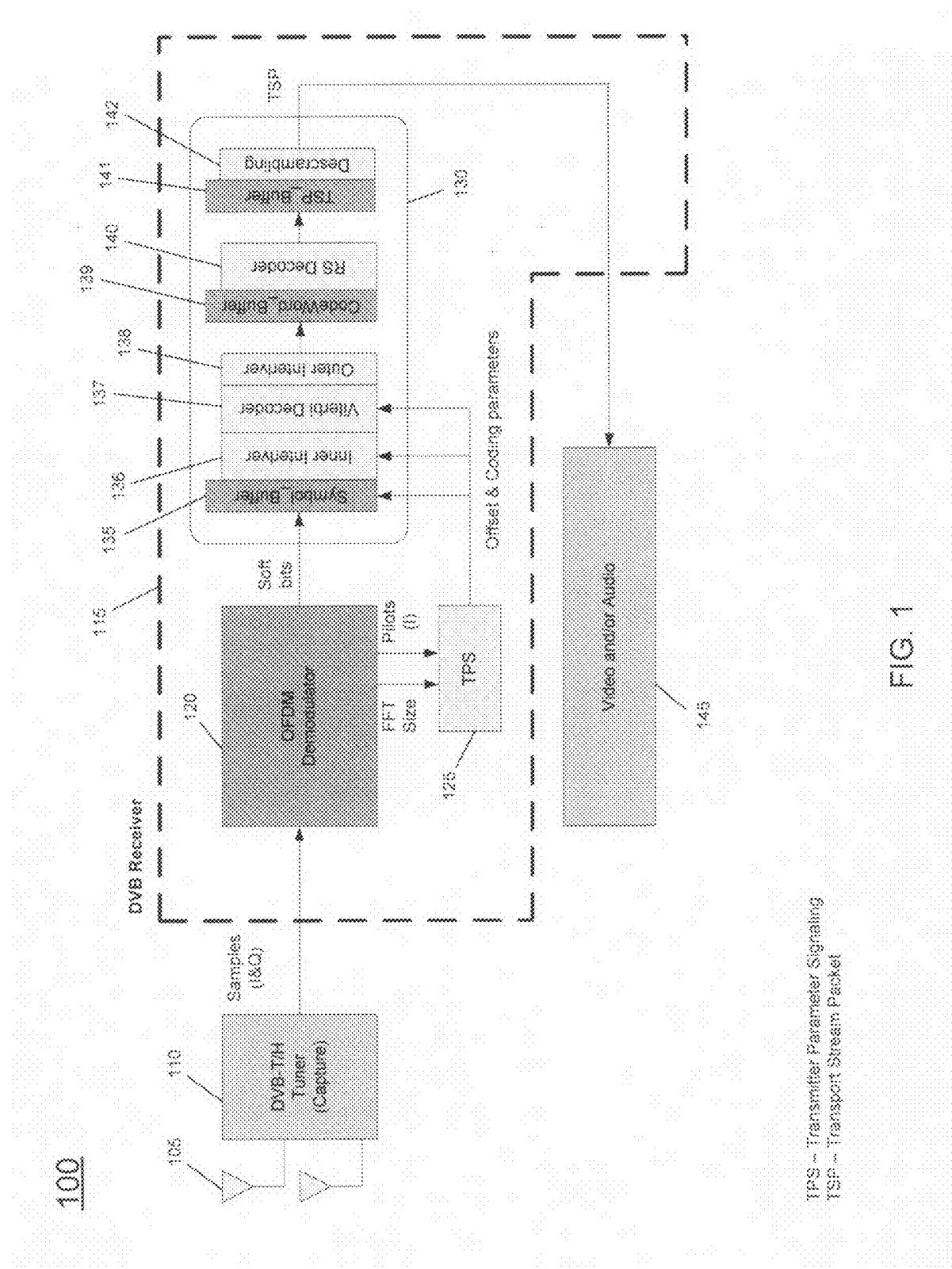
FIG. 1 is a block diagram in one embodiment of the invention.

In contrast to traditional centralized frame synchronization as described above, FIG. 1 is a block diagram for distributed frame synchronization in one embodiment of the invention. A complete data frame may be first acquired using antenna 105 and tuner 110. The data may include transmitter parameter signaling (TPS) data. TPS data may provide information regarding coding parameters such as synchronization words, frame number, modulation type, and code rate (modulation and coding scheme (MCS)).

In one embodiment of the invention, symbol interleaving may start after the demodulator 120 completes the demodulation of an OFDM symbol included in the data. The demodulated OFDM symbol may be received into a buffer 135. Symbol interleaving may occur in blocks 136, 137, 138 using offset and modulation type parameters obtained from block 125, which may include TPS data.

In one embodiment of the invention, an intermediate synchronization point common for, as an example only, symbol interleaving and RS decoding may be precomputed based on, for example, MCS and FFT mode information included in the TPS data. Table 1 lists exemplary intermediate synchronization points in symbol offset (from the beginning of a superframe) for MCS in an 8 k FFT mode.

TABLE 1

| Code Rate | Modulation | | |
|---|---|---|---|
| | QPSK | 16QAM | 64QAM |
| 1/2 | 17 | 17 | 17 |
| 2/3 | 17 | 17 | 17 |
| 3/4 | 34 | 17 | 34 |
| 5/6 | 17 | 17 | 17 |
| 7/8 | 68 | 34 | 68 |

For example, Table 1 illustrates that potential intermediate synchronization points may be located at symbols 0, 17, 34, and 51 of frames 1, 2, 3, and 4 under the following conditions:

8K FFT (mode), 16 QAM (modulation type), ¾ (code rate). In other words, potential intermediate synchronization points may be located at 17 symbol intervals in one embodiment of the invention. Thus, a synchronization point location (e.g., RS synchronization point) or synchronization points (e.g., symbol interleaving synchronization point, RS synchronization point) may be predetermined based on TPS information (e.g., code rate, modulation type).

In one embodiment of the invention, the data is next received in buffer 139. In block 140, RS decoding may start. In one embodiment of the invention, RS decoding may start at the beginning of a superframe. However, RS decoding may also occur when an intermediate synchronization point is reached.

In one embodiment of the invention, the data may then be received in another buffer 141. Descrambling may occur in block 142. For example only, the descrambling may start after the synchronization byte, 0xB8 of a transport stream packet (TSP), is found. As another example, the descrambling may start after the data part of a RS packet is found. The designated PRBS may then be applied to TSP for descrambling. The TSP may then be further processed as, for example, video and/or audio data in block 145.

As noted above, three buffers 135, 139, 141 may be used respectively for symbol interleaving, RS decoding, and descrambling. In contrast, some traditional practices utilize a single buffer for processing the data. In other embodiments of the invention, a first buffer may be shared for, as an example, symbol interleaving and RS decoding while a second buffer is used for descrambling.

Figure 2:
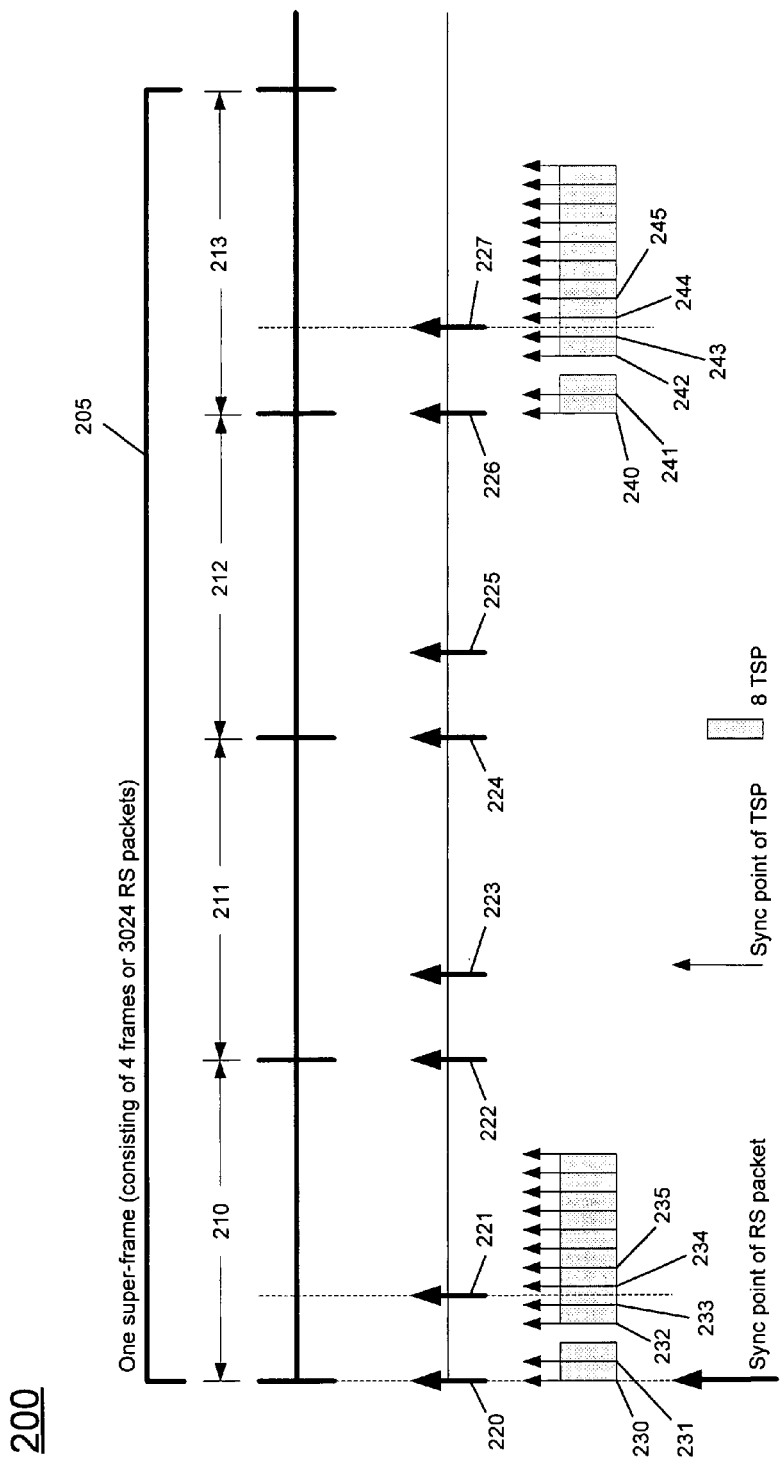
FIG. 2 illustrates data in one embodiment of the invention.

FIG. 2 illustrates data in one embodiment of the invention. For example, data 200 may be configured as 8 k FFT (mode), 16 QAM (modulation), and 34 (code rate). Data 200 may include a superframe 205 that may further include four frames 210, 211, 212, 213. Each of the four frames 210, 211, 212, 213 may include 68 symbols.

In one embodiment of the invention, symbol interleaving a demodulated OFDM symbol may begin at a synchronization point. This synchronization point may occur at any symbol such as, for example, the beginning of a superframe 205. However, the synchronization point may occur after the beginning of the superframe in another embodiment of the invention. For example, the synchronization point may be located at the beginning of a frame (e.g., 211).

Decoding a Reed Solomon (RS) packet included in the data 200 may be based on a synchronization point. In one embodiment of the invention, the RS synchronization point (e.g., 220) may occur at the beginning of a superframe 205. However, the RS synchronization point may also occur at an intermediate checkpoint (e.g., 221 or 222) located after the beginning of a superframe 205. The symbol interleaving synchronization point and the RS synchronization point may be located at a shared symbol such as the symbol located at 220 or 221. However, the symbol interleaving synchronization point and the RS synchronization point may be located at different symbols such as, respectively, 220 and 221. There may be one or more potential intermediate synchronization points located between the symbol interleaving synchronization point and the RS synchronization point.

Descrambling a transport stream packet (TSP) included in the data 200 may be based on a synchronization point. In one embodiment of the invention, the descrambling synchronization point (e.g., 230) may occur at the beginning of a superframe 205. However, the descrambling synchronization point may also occur after the beginning of superframe (e.g., 235). The descrambling synchronization point and, for example, the RS synchronization point may be located respectively at a symbol located at 240, 226. However, the descrambling synchronization point and the RS synchronization point may be located, respectively, at different symbols 241, 226. There may be one or more potential intermediate synchronization points located between the symbol interleaving synchronization point and the RS synchronization point.

In one embodiment of the invention, at least one of the symbol interleaving synchronization point, the RS synchronization point, and the descrambling synchronization point may be located after a beginning of a superframe 205 included in the data 200. In another embodiment of the invention, each of the symbol interleaving synchronization point, the RS synchronization point, and the descrambling synchronization point is located after a beginning of a superframe 205.

Thus, use of intermediate synchronization points may achieve faster synchronization than is possible with traditional centralized frame synchronization. Faster synchronization may facilitate power savings. Furthermore, use of a distributed local memory system (i.e., multiple buffers for symbol interleaving, RS decoding, and descrambling) for data buffering may also reduce power consumption. The use of intermediate synchronization points may also shorten any delay to the first decoded TSP greatly. This may enhance the user experience due to, for example, swift channel switching and better audio/video quality.

In one embodiment of the invention, a DVB-H receiver may operate using the following parameters: Burst size (Bs) =2 Mb; Burst bitrate (Bb)=15 Mbps; Max Burst duration (Bd)=140 ms; constant bit rate of the elementary stream (Cb) =350 Kbps; Off-time (Ot)=6.10 s; Synchronization time (St) =250 ms; and Delta-t jitter (Dj)=10 ms. Of course, embodiments of the invention are not limited to DVB-H receivers but may also be implemented with the following technologies, which are listed as examples only: DVB-T, T-DMB (terrestrial-digital multimedia broadcasting), ISDB-T (integrated services digital broadcasting-terrestrial), and similar multimedia data frame structure formats.

Embodiments may be implemented in an algorithm that can be executed in many different system types. For example, embodiments may be implemented in computer systems such as server computers, personal computers, mobile devices such as cellular telephones and so forth. In such processor-based systems, an algorithm in accordance with an embodiment may be performed in a general-purpose processor such as a microprocessor, a graphics processing unit (GPU) or other such processing unit.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one machine readable non-transitory medium comprising instructions that when executed on a computing device cause the computing device to perform a method comprising:
   receiving unsynchronized data that includes transmitter parameter signaling (TPS) information;
   symbol interleaving the data based on a first synchronization point, the first synchronization point including a symbol interleaving synchronization point;
   decoding the data based on a second synchronization point, the second synchronization point including a data packet synchronization point; and
   descrambling the data based on a third synchronization point to synchronize the data, the third synchronization point including a transport stream packet (TSP) synchronization point;
   wherein at least one of the first, second, and third synchronization points is located after a beginning of a superframe included in the data;
   wherein the first, second, and third synchronization points are all located within the superframe.

2. The at least one medium of claim 1, the method further comprising:
   storing a demodulated symbol, included in the data, in a first buffer;
   storing the decoded data in a second buffer; and storing the descrambled data in a third buffer.

3. The at least one medium of claim 1, wherein the first synchronization point and the second synchronization point are located at a shared symbol.

4. The at least one medium of claim 1, wherein the first synchronization point and the second synchronization point are not located at a shared symbol.

5. The at least one medium of claim 1, wherein none of the first synchronization point, the second synchronization point, or the third synchronization point is located at a shared symbol.

6. The at least one medium of claim 1, the method further comprising predetermining the location of the first and second synchronization points based on the TPS information.

7. The at least one medium of claim 6, the method further comprising predetermining the location of the first and second synchronization points based on a code rate included in the TPS information.

8. The at least one medium of claim 7, the method further comprising predetermining the location of the second synchronization point based on a modulation type included in the TPS information.

9. The at least one medium of claim 1, wherein two of the first, second, and third synchronization points are located after the beginning of the superframe and one of the first, second, and third synchronization points is located at the beginning of the superframe.

10. The at least one medium of claim 8, wherein the first synchronization point, the second synchronization point, and the third synchronization point are each located after the beginning of the superframe included in the data.

11. An apparatus comprising:
    a memory to receive unsynchronized data; and
    a processor, coupled to the memory, to interleave the data based on a first synchronization point; decode the data based on a second synchronization point; and descramble the data based on a third synchronization point;
    wherein (a) the first synchronization point is to include a symbol interleaving synchronization point, (b) the second synchronization point is to include a data packet synchronization point, (c) the third synchronization point is to include a transport stream packet (TSP) synchronization point, (d) the first, second, and third synchronization points are all to be located within a superframe, and (e) at least one of the first, second, and third synchronization points is to be located after a beginning of the superframe included in the data.

12. The apparatus of claim 11, further comprising a first buffer to store interleaved data and a second buffer to store decoded data, the first buffer and the second buffer coupled to the memory.

13. The apparatus of claim 11, wherein the processor is to locate the first synchronization point at a first symbol and the second synchronization point at a second symbol.

14. The apparatus of claim 11, wherein the processor is to locate the first synchronization point at a first symbol and the second synchronization point at the first symbol, the first symbol to be located after the beginning of the superframe.

15. An article comprising a non-transitory medium storing instructions that enable a processor-based system to:
    receive unsynchronized data;
    symbol interleave the data based on a first synchronization point;
    decode the data based on a second synchronization point; and
    descramble the data based on a third synchronization point to synchronize the data;
    wherein (a) the first synchronization point includes a symbol interleaving synchronization point, (b) the second synchronization point includes a data packet synchronization point, (c) the third synchronization point includes a transport stream packet (TSP) synchronization point, (d) the first, second, and third synchronization points are all located within a superframe, and (e) at least one of the first, second, and third synchronization points is located after a beginning of the superframe included in the data.

16. The article of claim 15, further storing instructions that enable the processor based-system to store a demodulated symbol included in the data in a first buffer; store the decoded data in a second buffer; and store the descrambled data in a third buffer.

17. The article of claim 15, wherein the first synchronization point and the second synchronization point are located at a shared symbol.

18. The article of claim 15, wherein the first synchronization point and the second synchronization point are not located at a shared symbol.

19. The article of claim 15, wherein at least two of the first synchronization point, the second synchronization point, and the third synchronization point are located after the beginning of the superframe included in the data.

20. The at least one medium of claim 1, wherein the second synchronization point includes a Reed Solomon data packet synchronization point.

* * * * *